(12) United States Patent
Xiong et al.

(10) Patent No.: US 12,088,074 B2
(45) Date of Patent: Sep. 10, 2024

(54) WIRING SUPPORT CAPABLE OF ADJUSTING WIDTH OF WIRE SLOT

(71) Applicant: ZHEJIANG SHIP ELECTRONICS TECHNOLOGY CO., LTD, Ningbo (CN)

(72) Inventors: Shaowei Xiong, Ningbo (CN); Weihua Zhao, Ningbo (CN); Rui Xia, Ningbo (CN); Ming Cao, Ningbo (CN); Chengzong Ju, Ningbo (CN)

(73) Assignee: ZHEJIANG SHIP ELECTRONICS TECHNOLOGY CO., LTD, Ningbo (CN)

( * ) Notice: Subject to any disclaimer, the term of this patent is extended or adjusted under 35 U.S.C. 154(b) by 0 days.

(21) Appl. No.: 18/246,020

(22) PCT Filed: Mar. 5, 2021

(86) PCT No.: PCT/CN2021/079348
§ 371 (c)(1),
(2) Date: Mar. 20, 2023

(87) PCT Pub. No.: WO2022/083045
PCT Pub. Date: Apr. 28, 2022

(65) Prior Publication Data
US 2023/0361544 A1 Nov. 9, 2023

(30) Foreign Application Priority Data

Oct. 22, 2020 (CN) .......................... 202011135536.6

(51) Int. Cl.
*F16L 3/00* (2006.01)
*H02G 3/04* (2006.01)
(52) U.S. Cl.
CPC .................................. *H02G 3/045* (2013.01)

(58) Field of Classification Search
CPC ..... H02G 3/045; H02G 3/0406; H02G 3/0437
See application file for complete search history.

(56) References Cited

U.S. PATENT DOCUMENTS 3,598,349 A * 8/1971 Drake .................. H02G 3/0456
248/68.1
3,680,817 A * 8/1972 Gogan ................. H02G 3/0437
248/68.1
(Continued)

FOREIGN PATENT DOCUMENTS

CN 202997444 U 6/2013
CN 205004711 U 1/2016
(Continued)

OTHER PUBLICATIONS

International Search Report dated Jul. 7, 2021 from PCT Application No. PCT/CN2021/079348.

*Primary Examiner* — Amy J. Sterling
(74) *Attorney, Agent, or Firm* — INNOVATION CAPITAL LAW GROUP, LLP; Vic Lin

(57) ABSTRACT

Disclosed is a wiring support capable of adjusting the width of a wire slot, including: a first end plate and a second end plate, each of the first end plate and the second end plate being provided with at least one wiring through slot; a first support plate and a second support plate that are slidably connected, the first support plate being provided with a plurality of first connecting portions in a sliding direction thereof, the second support plate being provided with a plurality of second connecting portions in a sliding direction thereof; and a separating member, including a folding portion, a first folding plate and a second folding plate, wherein the first folding plate and the second folding plate are connected by means of the folding portion, both the first folding plate and the second folding plate can be folded along the folding portion.

9 Claims, 3 Drawing Sheets

(56) References Cited

U.S. PATENT DOCUMENTS

| | | | | |
|---|---|---|---|---|
| 3,791,613 | A * | 2/1974 | Nollen | H02G 3/0456 248/68.1 |
| 4,432,519 | A * | 2/1984 | Wright | H02G 3/263 174/72 A |
| 5,639,048 | A * | 6/1997 | Bartholomew | F16L 3/26 248/68.1 |
| 8,573,409 | B2 * | 11/2013 | White | H02G 3/0608 248/65 |
| 9,841,123 | B1 * | 12/2017 | White | H02G 3/0608 |
| 10,003,180 | B1 * | 6/2018 | Krietzman | H02G 3/0456 |
| 10,128,642 | B2 * | 11/2018 | Cardin | H02G 3/0456 |
| 11,479,921 | B2 * | 10/2022 | Brooker | E01B 2/00 |
| 11,594,866 | B2 * | 2/2023 | Keskar | H02G 3/0406 |
| 2009/0200057 | A1 * | 8/2009 | Caveney | H02G 3/045 174/101 |
| 2009/0260846 | A1 * | 10/2009 | Henry | H02G 3/0406 174/101 |
| 2010/0101855 | A1 * | 4/2010 | Handler | H02G 3/105 174/505 |
| 2015/0353319 | A1 * | 12/2015 | Henderson | H02G 3/0456 248/68.1 |
| 2023/0078478 | A1 * | 3/2023 | Kloft | H02G 3/0437 174/68.3 |
| 2023/0231368 | A1 * | 7/2023 | Johnson | H02G 3/0456 174/68.1 |

FOREIGN PATENT DOCUMENTS

| | | |
|---|---|---|
| CN | 109379860 A | 2/2019 |
| CN | 208939487 U | 6/2019 |
| CN | 209134011 U | 7/2019 |
| CN | 110518512 A | 11/2019 |
| CN | 211296056 U | 8/2020 |
| CN | 111799720 A | 10/2020 |
| CN | 112332328 A | 2/2021 |
| CN | 112350240 A | 2/2021 |
| WO | 9104597 A1 | 4/1991 |

* cited by examiner

WIRING SUPPORT CAPABLE OF ADJUSTING WIDTH OF WIRE SLOT

TECHNICAL FIELD

The present invention relates to the technical field of wiring of multiple wire harnesses, in particular to a wiring support capable of adjusting the width of a wire slot.

DESCRIPTION OF RELATED ART

In conditions where many wire harnesses are used, such as cabinets and other equipment, it is easy to cause intertwining of the wire harnesses. Therefore, people often use wire harness supports to realize more ordered wiring of the wire harnesses, so as to facilitate the wire organization.

However, the existing wire harness support only has the function of gathering multiple wire harnesses, and cannot classify weak wire harnesses and strong wire harnesses in the multiple wire harnesses, resulting in poor classification effect for wire harnesses. In addition, the size of multiple wiring spaces cannot be adjusted, resulting in low space utilization. When the number of one type of wire harnesses far exceeds that of other types of wire harnesses, one of the wiring spaces will be crowded, while the other wiring spaces will have few wirings, which will occupy more space and waste resources.

BRIEF SUMMARY OF THE INVENTION

In view of the above-mentioned deficiencies in the prior art, the technical problem to be solved by the present invention is to provide a wiring support capable of adjusting the width of a wire slot, which is used to solve such problems in the prior art that a wire harness support cannot classify wire harnesses and the size of the wiring space cannot be adjusted.

The technical solution adopted by the present invention to solve its technical problem is to provide a wiring support capable of adjusting the width of a wire slot, including: a first end plate and a second end plate, each of the first end plate and the second end plate being provided with at least one wiring through slot;
  at least two support plates, including a first support plate connected to the first end plate and a second support plate connected to the second end plate, the first support plate and the second support plate being slidably connected, the first support plate being provided with a plurality of first connecting portions in a sliding direction thereof, the second support plate being provided with a plurality of second connecting portions in a sliding direction thereof; and
  a separating member, including a folding portion, a first folding plate and a second folding plate, wherein the first folding plate and the second folding plate are connected by means of the folding portion, both the first folding plate and the second folding plate can be folded along the folding portion, an end of the first folding plate away from the folding portion is detachably connected to any one of the first connecting portions, and an end of the second folding plate away from the folding portion is detachably connected to any one of the second connecting portions.

Preferably, the first support plate is provided with a row of first connecting portions on each of two sides in a sliding direction thereof, and the second support plate is provided with a row of second connecting portions on each of two sides in a sliding direction thereof.

Preferably, the first connecting portion includes a first slot hole, and the second connecting portion includes a second slot hole; the end of the first folding plate away from the folding portion is provided with two first limiting blocks, and the end of the second folding plate away from the folding portion is provided with two second limiting blocks; the first limiting block snaps into the first slot hole to limit the movement of the first folding plate and the first support plate, and the second limiting block snaps into the second slot hole to limit the movement of the second folding plate and the second support plate.

Preferably, the first slot holes in each row are equally spaced, and the second slot holes in each row are equally spaced.

Preferably, when passing through the first slot hole and snapping into the second slot hole, the first limiting block can limit the movement of the separating member, the first support plate and the second support plate relative to one another.

Preferably, each of the first end plate and the second end plate is provided with two wiring through slots.

Preferably, the height of a bottommost end of the wiring through slot is greater than or equal to that of an upper surface of the support plate.

Preferably, each of the first end plate and the second end plate includes: a main body, the wiring through slot being formed in the main body, the support plate being fixedly connected to the main body; and a fixing portion vertically fixed to the main body, the fixing portion being configured to fix the first end plate or the second end plate.

Preferably, at least one connector is arranged at each of two ends of the first end plate and the second end plate, and the connectors are configured to connect multiple wiring supports.

Compared with the prior art, the present invention at least has the following beneficial effects.

1. The first end plate, the first support plate and the first folding plate define a first wiring space, and the second end plate, the second support plate and the second folding plate define a second wiring space. Since the first folding plate and the second folding plate can be folded, when the first support plate and the second support plate slide relative to each other, the first folding plate and the second folding plate will be driven to fold, thereby changing an inclined angle between the first folding plate and the second folding plate, so that the sizes of the first wiring space and the second wiring space can be changed. More specifically, when the first support plate and the second support plate slide away from each other, the first wiring space and the second wiring space are increased at the same time. When the first support plate and the second support plate slide toward each other, the first wiring space and the second wiring space are reduced at the same time. In this way, by only moving the first support plate or the second support plate, the sizes of the first wiring space and the second wiring space can be adjusted, so the operation is more convenient, and the adjustment is simpler.
2. Multiple wiring spaces are adjustable, so different types of wire harnesses can be classified into the first wiring space and the second wiring space, so as to realize the classified arrangement of multiple types of wire harnesses. Moreover, the sizes of the first wiring space and the second wiring space can also be adjusted according to the number of different types of wire harnesses, so that the sizes of multiple wiring spaces can be adaptively changed according to the number of wire harnesses. Therefore, regardless of the number of wire harnesses in a wiring space, the size of the corresponding wiring space can be adjusted to exactly accommodate these wire harnesses, so that the wire harnesses do not have room to sway in the wiring space, thus achieving the effect of limiting the multiple wire harnesses.

3. The separating member is configured to have a first folding plate and a second folding plate, and the two folding plates can be folded mutually. This arrangement achieves the following advantages. First, the adjustment of the wiring space can be realized just by adjusting the position of a corresponding folding plate on the support plate, which facilitates the operation of staff during the adjustment. Second, during the size adjustment of one of the wiring spaces, the size of the other wiring space changes very little, realizing the separate adjustment of a single wiring space. Third, the staff can also adjust the positions of the first folding plate and the second folding plate on the support plate at the same time according to the actual use requirements, that is, the inclined angle between the first folding plate and the second folding plate remains unchanged, so that the sum of the first wiring space and the second wiring space remains unchanged. In this way, the maximum number of wire harnesses that can be accommodated in one wiring support remains unchanged, and therefore the wiring support can be used more flexibly. Fourth, since the first folding plate, the second folding plate and the support plate are fixed and arranged in a triangular shape, the separating member will not sway after being fixed on the support plate, and the formed first and second wiring spaces are more stable, thereby prolonging the service life of the wiring support.

4. The height of the bottommost end of the wiring through slot is greater than or equal to that of an upper surface of the support plate. During the wiring of the wire harness, the surface of the wire harness will be also in contact with the bottom end of the wiring through slot while in contact with the support plate, so that the wiring through slot can share an external force acting on the support plate, and the support plate will not be damaged under an excessive stress, thereby improving the service life of the entire wiring support.

In figures: 110, first end plate; 120, second end plate; 121, wiring through slot; 122, main body; 123, fixing portion; 210, first support plate; 211, first slot hole; 220, second support plate; 221, second slot hole; 300, separating member; 310, first folding plate; 311, first limiting block; 320, folding portion; 330, second folding plate; 331, second limiting block; 400, connector.

DETAILED DESCRIPTION OF THE INVENTION

The following are specific embodiments of the present invention and further describe the technical solutions of the present invention in conjunction with the accompanying drawings, but the present invention is not limited to these embodiments.

Figure 1:
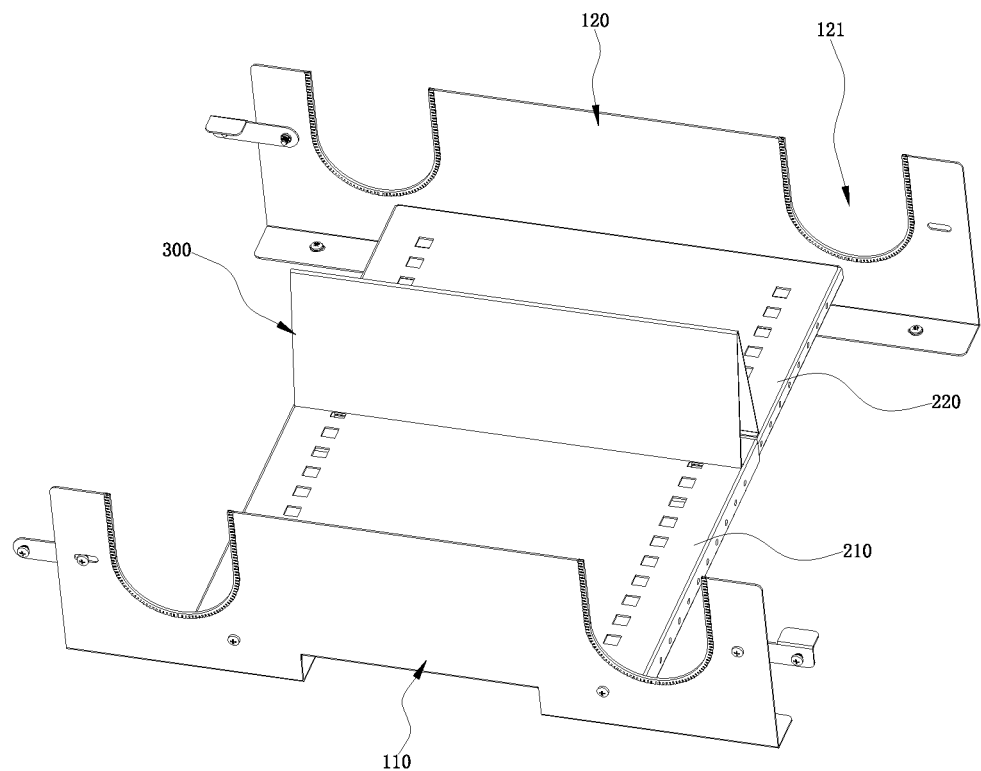
FIG. 1 is a schematic structural diagram of a wiring support according to an embodiment.
Figure 2:
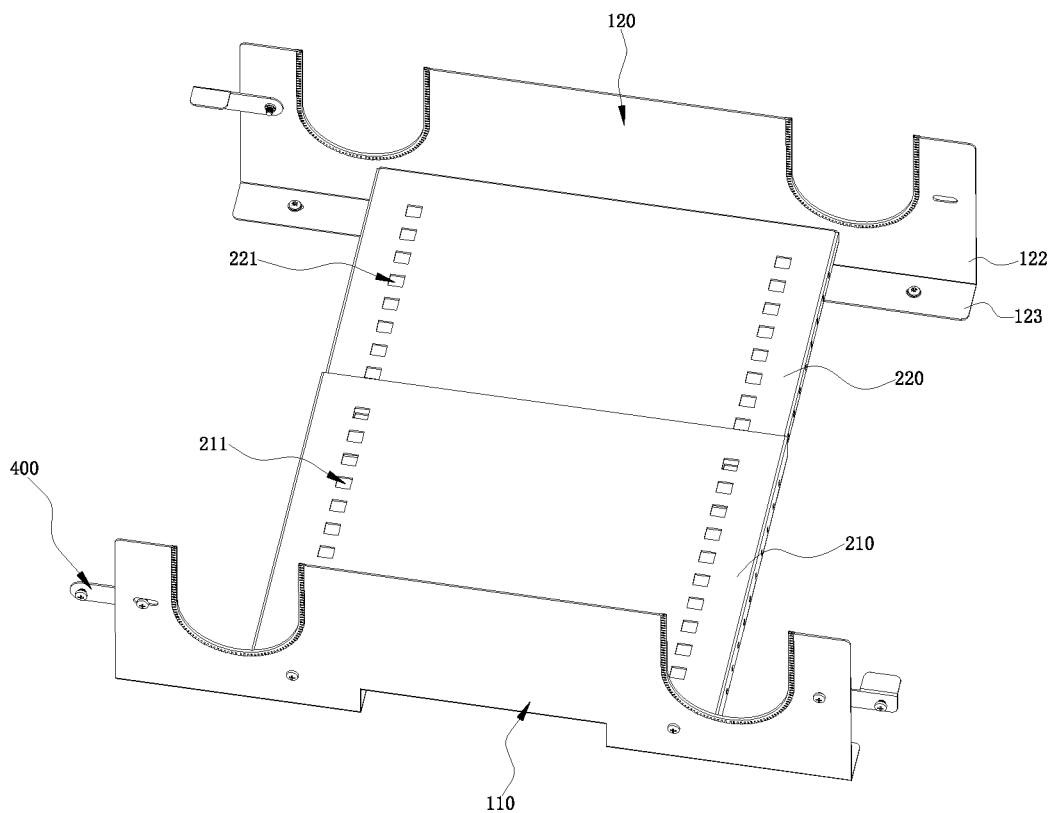
FIG. 2 is a schematic structural diagram of the wiring support in FIG. 1 according to an embodiment without a separating member.
Figure 3:
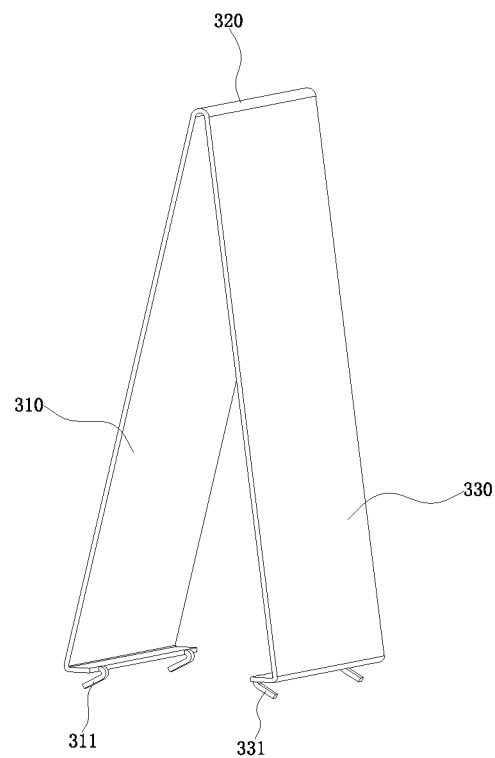
FIG. 3 is a schematic structural diagram of the separating member according to an embodiment.

Referring to FIGS. 1-3, the present invention discloses a wiring support capable of adjusting the width of a wire slot, including:

a first end plate 110 and a second end plate 120, each of the first end plate 110 and the second end plate 120 being provided with at least one wiring through slot 121;

at least two support plates, including a first support plate 210 connected to the first end plate 110 and a second support plate 220 connected to the second end plate 120, the first support plate 210 and the second support plate 220 being slidably connected, the first support plate 210 being provided with a plurality of first connecting portions in a sliding direction thereof, the second support plate 220 being provided with a plurality of second connecting portions in a sliding direction thereof; and a separating member 300, including a folding portion 320, a first folding plate 310 and a second folding plate 330, wherein the first folding plate 310 and the second folding plate 330 are connected by means of the folding portion 320, both the first folding plate 310 and the second folding plate 330 can be folded along the folding portion 320, an end of the first folding plate 310 away from the folding portion 320 is detachably connected to any one of the first connecting portions, and an end of the second folding plate 330 away from the folding portion 320 is detachably connected to any one of the second connecting portions.

Specifically, the first end plate 110, the first support plate 210 and the first folding plate 310 define a first wiring space, and the second end plate 120, the second support plate 220 and the second folding plate 330 define a second wiring space. Since the first folding plate 310 and the second folding plate 330 can be folded, when the first support plate 210 and the second support plate 220 slide relative to each other, the first folding plate 310 and the second folding plate 330 will be driven to fold, thereby changing an inclined angle between the first folding plate 310 and the second folding plate 330 so that the sizes of the first wiring space and the second wiring space can be changed. More specifically, when the first support plate 210 and the second support plate 220 slide away from each other, the first wiring space and the second wiring space are increased at the same time. When the first support plate 210 and the second support plate 220 slide toward each other, the first wiring space and the second wiring space are reduced at the same time. In this way, by only moving the first support plate 210 or the second support plate 220, the sizes of the first wiring space and the second wiring space can be adjusted, so the operation is more convenient, and the adjustment is simpler. Moreover, in this embodiment, since the first folding plate 310 is detachably connected to the first connecting portion and the second folding plate 330 is detachably connected to the second connecting portion, the first folding plate 310 can be installed on the first connecting portion at any position to adjust the first wiring space to a desired size. The second folding plate 330 can also be installed on the second connecting part at any position to adjust the second wiring space to a desired size.

Combined with the usage scenarios, multiple wiring spaces are adjustable, so different types of wire harnesses can be classified into the first wiring space and the second wiring space, so as to realize the classified arrangement of multiple types of wire harnesses. Moreover, the sizes of the first wiring space and the second wiring space can also be adjusted according to the number of different types of wire harnesses, so that the sizes of multiple wiring spaces can be adaptively changed according to the number of wire harnesses. Therefore, regardless of the number of wire harnesses in a wiring space, the size of the corresponding wiring space can be adjusted to exactly accommodate these wire harnesses, so that the wire harnesses do not have room to sway in the wiring space, thus achieving the effect of limiting the multiple wire harnesses.

The separating member 300 is configured to have a first folding plate 310 and a second folding plate 330, and the two folding plates can be folded mutually so that the first wiring space and the second wiring space can be adjusted separately. Specifically, if necessary, the first wiring space can be adjusted just by adjusting a distance between the first folding plate 310 and the first end plate 110 separately, i.e., changing the included angle between the first folding plate 310 and the second folding plate 330, without adjusting the position of the second folding plate 330 on the support plate. This arrangement achieves the following advantages. First, the adjustment of the wiring space can be realized just by adjusting the position of a corresponding folding plate on the support plate, which facilitates the operation of staff during the adjustment. Second, during the size adjustment of one of the wiring spaces, the size of the other wiring space changes very little, realizing the separate adjustment of a single wiring space. Third, the staff can also adjust the positions of the first folding plate 310 and the second folding plate 330 on the support plate at the same time according to the actual use requirements, that is, the inclined angle between the first folding plate 310 and the second folding plate 330 remains unchanged, so that the sum of the first wiring space and the second wiring space remains unchanged. In this way, the maximum number of wire harnesses that can be accommodated in one wiring support remains unchanged, and therefore the wiring support can be used more flexibly. Fourth, since the first folding plate 310, the second folding plate 330 and the support plate are fixed and arranged in a triangular shape, the separating member 300 will not sway after being fixed on the support plate, and the formed first and second wiring spaces are more stable, thereby improving the service life of the wiring support.

In summary, by this solution, multiple wiring spaces can be adjusted separately at multiple levels in many ways.

The first support plate 210 is provided with a row of first connecting portions on each of two sides in a sliding direction thereof, and the second support plate 220 is provided with a row of second connecting portions on each of two sides in a sliding direction thereof.

It should be noted that in this solution, a plurality of slide rails can also be arranged on the support plate, and the separating member 300 can slide on the slide rails and can be fixed to the support plate at any position on the slide rails with bolts or in other forms, so as to adjust the sizes of the first wiring space and the second wiring space.

The first connecting portion includes a first slot hole 211, and the second connecting portion includes a second slot hole 221. The end of the first folding plate 310 away from the folding portion 320 is provided with two first limiting blocks 311. The end of the second folding plate 310 away from the folding portion 320 is provided with two second limiting blocks 331. The first limiting block 311 snaps into the first slot hole 211 to limit the movement of the first folding plate 310 and the first support plate 210, and the second limiting block 331 snaps into the second slot hole 221 to limit the movement of the second folding plate 330 and the second support plate 220.

The first slot holes 211 in each row are equally spaced, and the second slot holes 221 in each row are equally spaced.

It should be noted that when the spacing between any two adjacent first slot holes 211/second slot holes 221 in the same row is smaller, the adjustment accuracy of the separating member 300 is higher, that is, the adjustment accuracy of the first wiring space and the second wiring space is higher. When the spacing between any two adjacent first slot holes 211/second slot holes 221 in the same row is larger, the adjustment accuracy of the separating member 300 is lower, that is, the adjustment accuracy of the first wiring space and the second wiring space is lower.

In this embodiment, the detachable connection between the support plate and the separating member 300 is realized through the engaging structure of the first slot holes 211 and the first limiting blocks 311 or the second slot holes 221 and the second limiting blocks 331. In this way, the position of the separating member 300 can be adjusted, and finally the purpose of adjusting the sizes of the first wiring space and the second wiring space is achieved.

When passing through the first slot hole 211 and snapping into the second slot hole 221, the first limiting block 311 can limit the movement of the separating member 300, the first support plate 210 and the second support plate 220 relative to one another.

Specifically, the first limiting block 311 can limit the movement of the first support plate 210 and the first folding plate 310. In addition, when sliding the first support plate 210 and the second support plate 220 until any first slot hole 211 coincides with any second slot hole 221, the first limiting block 311 can pass through the first slot hole 211 and also snap into the second slot hole 221, thus locking the first support plate 210 and the second support plate 220. Therefore, there is no need to additionally provide a locking member to lock the first support plate 210 and the second support plate 220, which ingeniously simplifies the structure without reducing the use effect.

Each of the first end plate 110 and the second end plate 120 is provided with two wiring through slots 121.

When a wiring support is used alone, a wire harness can go into the wiring space from one wiring through slot 121, and then go out from another wiring through slot 121. When multiple wiring supports are used together, the wire harness can go in from the wiring through slot 121 of one of the wiring supports, and then go out from the wiring through slot of another wiring support.

The height of a bottommost end of the wiring through slot 121 is greater than or equal to that of an upper surface of the support plate.

During the wiring of the wire harness, the surface of the wire harness will be also in contact with the bottom end of the wiring through slot 121 while in contact with the support plate, so that the wiring through slot 121 can share an external force acting on the support plate, and will not cause the support plate to be damaged under an excessive stress, thereby prolonging the service life of the entire wiring support.

Each of the first end plate 110 and the second end plate 120 includes: a main body 122, the wiring through slot 121 being formed in the main body 122, the support plate being fixedly connected to the main body 122; and a fixing portion 123 vertically fixed to the main body 122, the fixing portion 123 being configured to fix the first end plate 110 or the second end plate 120.

Specifically, the fixing portion 123 is fixed to equipment such as an equipment cabinet, so as to fix the entire wiring support on the equipment such as the equipment cabinet, and the fixing portion 123 and the equipment such as the equipment cabinet can be fixed by bolts or the like.

At least one connector 400 is arranged at each of two ends of both the first end plate 110 and the second end plate 120, and the connectors 400 are configured to connect multiple wiring supports.

The connectors 400 connect the multiple wiring supports into one, realizing the coordinated use of multiple wiring supports. Staff can flexibly assemble the multiple wiring supports to meet different working conditions.

The specific embodiments described herein are only examples for illustrating the spirit of the present invention. Those skilled in the art to which the present invention belongs can make various modifications or additions to the specific embodiments described or use similar alternatives, without departing from the spirit of the present invention or going beyond the scope defined in the appended claims.

What is claimed is:

1. A wiring support capable of adjusting the width of a wire slot, comprising:
   a first end plate and a second end plate, each of the first end plate and the second end plate being provided with at least one wiring through slot;
   at least two support plates, comprising a first support plate connected to the first end plate and a second support plate connected to the second end plate, the first support plate and the second support plate being slidably connected, the first support plate being provided with a plurality of first connecting portions in a sliding direction thereof, the second support plate being provided with a plurality of second connecting portions in a sliding direction thereof; and
   a separating member, comprising a folding portion, a first folding plate and a second folding plate, wherein the first folding plate and the second folding plate are connected by means of the folding portion, both the first folding plate and the second folding plate can be folded along the folding portion, an end of the first folding plate away from the folding portion is detachably connected to any one of the first connecting portions, and an end of the second folding plate away from the folding portion is detachably connected to any one of the second connecting portions.

2. The wiring support capable of adjusting the width of a wire slot according to claim 1, wherein the first support plate is provided with a row of first connecting portions on each of two sides in a sliding direction thereof, and the second support plate is provided with a row of second connecting portions on each of two sides in a sliding direction thereof.

3. The wiring support capable of adjusting the width of a wire slot according to claim 2, wherein the first connecting portion comprises a first slot hole, and the second connecting portion comprises a second slot hole; the end of the first folding plate away from the folding portion is provided with two first limiting blocks, and the end of the second folding plate away from the folding portion is provided with two second limiting blocks; the first limiting block snaps into the first slot hole to limit the movement of the first folding plate and the first support plate, and the second limiting block snaps into the second slot hole to limit the movement of the second folding plate and the second support plate.

4. The wiring support capable of adjusting the width of a wire slot according to claim 3, wherein the first slot holes in each row are equally spaced, and the second slot holes in each row are equally spaced.

5. The wiring support capable of adjusting the width of a wire slot according to claim 3, wherein, when passing through the first slot hole and snapping into the second slot hole, the first limiting block can limit the movement of the separating member, the first support plate and the second support plate relative to one another.

6. The wiring support capable of adjusting the width of a wire slot according to claim 1, wherein each of the first end plate and the second end plate is provided with two wiring through slots.

7. The wiring support capable of adjusting the width of a wire slot according to claim 6, wherein a height of a bottommost end of the wiring through slot is greater than or equal to that of an upper surface of the support plate.

8. The wiring support capable of adjusting the width of a wire slot according to claim 1, wherein each of the first end plate and the second end plate comprises: a main body, the wiring through slot being formed in the main body, the support plate being fixedly connected to the main body; and a fixing portion vertically fixed to the main body, the fixing portion being configured to fix the first end plate or the second end plate.

9. The wiring support capable of adjusting the width of a wire slot according to claim 1, wherein at least one connector is arranged at each of two ends of the first end plate and the second end plate, and the connectors are configured to connect multiple wiring supports.

* * * * *